United States Patent Office 2,749,349
Patented June 5, 1956

2,749,349

VINYLPYRIDINE-N-OXIDES AND PROCESS OF MAKING THEM

Francis E. Cislak, Indianapolis, Ind., assignor to Reilly Tar & Chemical Corporation, Indianapolis, Ind., a corporation of Indiana No Drawing. Application February 2, 1956,
Serial No. 562,929

8 Claims. (Cl. 260—290)

This invention relates to new composition of matter and to the process of making them. More particularly, it relates to vinylpyridine-N-oxides and to the process of making them. The vinylpyridine-N-oxides which are the subject of my current invention have the following general formula:

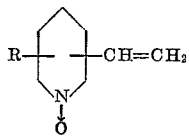

where R is hydrogen or lower alkyl.

The vinylpyridine-N-oxides are useful for the preparation of polymers and co-polymers. They may be polymerized to give hard, tough, non-brittle resins. The vinylpyridine-N-oxides may also be co-polymerized with other monomers (such as styrene, acrylonitrile, butadiene, isoprene, etc.) to give elastomers having valuable rubber-like properties. The polymerization or co-polymerization may be carried out in aqueous emulsion. Thus, for example, in making a co-polymer of 2-vinylpyridine-N-oxide with styrene, one may prepare an emulsion of 25 parts of 2-vinylpyridine-N-oxide, 25 parts of styrene, 100 to 150 parts of a 10% solution of sodium oleate, and one part of benzoyl peroxide. The mixture should be stirred continually for 16 to 30 hours. A latex-like product results which after coagulation, washing, and drying is a tough elastomer.

The vinylpyridine-N-oxides are also useful in the preparation of many pyridine derivatives. With pyridine hydrochloride, for example, 2-vinylpyridine-N-oxide may react to give a pyridylethyl-N-oxide-pyridinium hydrochloride. With alcohols pyridylethyl ether-N-oxides may be formed; with amines pyridylethylamine-N-oxides; with mercaptans pyridylethylsulfide-N-oxides.

I have found that I can prepare vinylpyridine-N-oxides from pyridine-ethan-2-ol, N-oxides. The pyridine-ethan-2-ol, N-oxides are new compounds; they are the subject of my co-pending application Serial No. 453,689 filed September 1, 1954. The vinylpyridine-N-oxides may be prepared from the pyridine-ethan-2-ol, N-oxides by heating in the presence of caustic or concentrated hydrochloric acid or concentrated sulfuric acid.

I have found that I can prepare vinylpyridine-N-oxides, with a minimum of polymerization, by vaporizing the corresponding pyridine-ethan-2-ol, N-oxide through a non-acid dehydrating catalyst.

I prefer to carry out my invention in a continuous process, although that is not necessary. In carrying out my invention by my preferred method, I preheat the pyridine-ethan-2-ol, N-oxide, pass it in the vapor phase through a non-acid dehydrating catalyst, maintained at a dehydrating temperature, and condense the vinylpyridine-N-oxide formed.

I can use any of a large number of dehydrating catalysts, such as alkali metal hydroxides, zinc chloride, alumina, silica-alumina, and the like. These catalysts may be used in any suitable form, for example, the alkali metal hydroxides may be fused or in aqueous solution or they may be adsorbed on a porous support; the alumina may be used in pellet form or as a very fine powder.

As suitable dehydrating temperatures, I have found temperatures above the boiling point of water, preferably above about 150° C.

In one specific embodiment of my present invention, 2-pyridine-ethan-2-ol, N-oxide, preferably dissolved in one to three parts of water is desirably preheated to a temperature of about 100° C. and passed into liquid aqueous caustic soda, of about 50% to 80% strength, maintained at a temperature of about 150° C. to 200° C. and being maintained under a partial vacuum. The hot caustic soda vaporizes the solution of 2-pyridine-ethan-2-ol, N-oxide and converts it into 2-vinylpyridine-N-oxide. The vapors of 2-vinylpyridine-N-oxide, water, and any unchanged 2-pyridine-ethan-2-ol, N-oxide are condensed in any suitable receiver. The 2-vinylpyridine-N-oxide boils above 100° C. at 5 mm. pressure.

4-vinylpyridine-N-oxide may be prepared in the manner described above by using 4-pyridine-ethan-2-ol, N-oxide in place of the 2-pyridine-ethan-2-ol, N-oxide.

2-vinyl-5-ethylpyridine-N-oxide may be prepared from 2-(5-ethylpyridine)-ethan-2-ol, N-oxide.

3-vinylpyridine-N-oxide may be prepared from 3-pyridine-ethan-1-ol, N-oxide.

I claim as my invention:

1. Vinylpyridine-N-oxides having the following general formula:

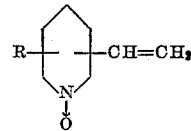

where R is a member of the group consisting of hydrogen and lower alkyl.

2. 2-vinylpyridine-N-oxide.
3. 2-vinyl-5-ethylpyridine-N-oxide.
4. 4-vinylpyridine-N-oxide.
5. 3-vinylpyridine-N-oxide.
6. A process for the production of vinylpyridine-N-oxides which comprises passing a pyridine-ethan-2-ol, N-oxide over caustic soda maintained at a temperature above about 150° C. and recovering the vinylpyridine-N-oxide.
7. The process of claim 6 in which 2-pyridine-ethan-2-ol, N-oxide is used to produce 2-vinylpyridine-N-oxide.
8. The process of claim 6 in which 2-(5-ethylpyridine)-ethan-2-ol, N-oxide is used to produce 2-vinyl-5-ethylpyridine-N-oxide.

References Cited in the file of this patent

Meisenheimer et al.: Chem. Abst., vol. 14, p. 2926 (1920).